United States Patent
McBride et al.

(10) Patent No.: US 6,671,278 B1
(45) Date of Patent: Dec. 30, 2003

(54) FRAME REFERENCE LOAD MODEL GENERATOR

(75) Inventors: Brian E. McBride, Kanata (CA); Jean Belanger, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/261,196

(22) Filed: Mar. 3, 1999

(30) Foreign Application Priority Data

Jul. 22, 1998 (CA) .............................................. 2243676

(51) Int. Cl.[7] .............................................. H04L 12/56
(52) U.S. Cl. ................... 370/395.41; 370/412; 370/471
(58) Field of Search .............................. 370/241.1, 250, 370/230, 352, 395, 412, 413, 252, 395.4, 395.41, 395.42, 395.43, 470, 471, 474

(56) References Cited

U.S. PATENT DOCUMENTS

| 4,835,770 A | * | 5/1989 | Hayano ........................ 370/429 |
| 5,231,633 A | * | 7/1993 | Hluchyj et al. ............... 370/429 |
| 5,602,826 A | * | 2/1997 | Yoshimura et al. .......... 370/248 |
| 5,764,626 A | * | 6/1998 | VanDervort .................. 370/232 |
| 5,862,136 A | * | 1/1999 | Irwin ............................ 370/395 |
| 5,956,348 A | * | 9/1999 | Creigh et al. ................ 370/528 |
| 6,108,713 A | * | 8/2000 | Sambamurthy et al. ..... 709/250 |
| 6,147,972 A | * | 11/2000 | Onishi et al. ................. 370/248 |
| 6,590,897 B1 | * | 7/2003 | Lauffenburger et al. | |

OTHER PUBLICATIONS

R.Jain, G.Babic, "Performance Testing Effort at the ATM Forum: An Overview", IEEE Communications Magazine, Aug. 1997, p. 110.

* cited by examiner

*Primary Examiner*—Alpus H. Hsu
*Assistant Examiner*—Roberta Stevens
(74) *Attorney, Agent, or Firm*—Marks & Clerk

(57) ABSTRACT

A reference load model generator for testing ATM communication devices. The generator comprises an interface for specifying a frame size (FS), an inter-frame gap (IFG) and an inter-cell gap (ICG) for modelling frame sources, and generates source ATM cell streams having the specified FS, IFG and ICG of the corresponding frame source. The generator also includes a multiplexer which receives the source cell streams and generates a single output cell stream.

18 Claims, 8 Drawing Sheets

FRAME REFERENCE LOAD MODEL GENERATOR

FIELD OF INVENTION

The invention generally relates to testing equipment for digital data communications systems, and more particularly to performance testing equipment which generates standardized traffic patterns in order to test Asynchronous Transfer Mode (ATM) communication devices.

BACKGROUND OF INVENTION

Performance testing of ATM data communication devices such as network nodes or switches is becoming more important as the ATM data communication technology matures. This is because the majority of ATM equipment providers implement standard protocols which have more or less equivalent functionality. Thus, the distinguishing factor between similar ATM communication devices is their performance under known, real world, conditions. Accordingly, the performance of an ATM device is one factor upon which customers base their purchasing decisions. The desire for performance testing requirements can be seen in the standards setting bodies and industry associations such as the International Telecommunications Union (ITU), the Internet Engineering Task Force (IETF) and the ATM Forum, where numerous performance testing specifications are currently in the process of being drafted.

Equipment for testing performance of ATM communications devices already exist. For example, the Interwatch 95000 by GN Nettest can generate ATM Adaptation Layer test frames.

However, effective performance testing requires the use of standardized traffic patterns, called reference load models (RLMs), for evaluating a system under test. The standardized traffic patterns are generated on the input ports of the device or system under test to see how it behaves under certain conditions. These standardized traffic patterns must be reproducible so that similar devices or systems from competing manufacturers can be compared under the same conditions.

Moreover, a good ATM reference load model generator does not exist at the "frame level", i.e., the level at which user information is packaged or presented prior to being converted into an ATM cell stream. Current ATM test generators are simple cell based generators that generate frames of a constant size. This type of frame traffic does not model real world traffic patterns.

Accordingly, there is a need for ATM test generators that can generate dynamic and well defined frame traffic patterns. Such a test generator should be able to generate a wide variety of frame traffic patterns, including frames of various size and spacing, using a set of standardized parameters which allow for reproducibility. With this type of generator, realistic traffic patterns can be modelled, and realistic and effective performance of ATM devices or systems can be achieved.

SUMMARY OF INVENTION

Broadly speaking, the invention provides a reference load model generator, comprising interface means for specifying a frame size (FS), an inter-frame gap (IFG) and an inter-cell gap (ICG) for modelling one or more frame sources. A frame source generator generates respective source cell streams, each according to the specified FS, IFG and ICG of the corresponding modelled frame source. A multiplexer receives the source cell streams and generates a single output stream.

In a preferred embodiment of the present invention, the interface means further specifies an arbitration scheme utilized by the multiplexing means in generating the single output stream.

Another broad aspect of the invention relates to a method for generating an ATM cell stream, comprising the steps of: (a) specifying a frame size (FS), an inter-frame gap (IFG) and an inter-cell gap (ICG) so as to model one or more frame sources; (b) generating respective source cell streams, each having the specified FS, IFG and ICG of the corresponding modelled frame source; and (c) generating a single output stream by multiplexing the source cell streams.

In a preferred embodiment of this aspect of the invention, the method further comprises the steps of specifying a multiplexer arbitration scheme, and multiplexing the source cell in accordance with the scheme so as to generate the single output stream.

In the preferred embodiment, the source cell streams are ATM cell streams defined at the frame level. In the preferred embodiment, the frame level is correlated to the common part convergence sublayer (CPCS) of the ATM adaption layer (AAL), such that the preferred source cell streams carry CPCS protocol data units (PDUs), for example, AAL 3/4 and 5 PDUs. The frame level may alternatively be correlated to other layers of the ATM protocol stack, whereby the source cell streams carry, for example, FR-SSCS PDUs.

The frame size is the length of a frame (i.e., at the frame level) in terms of the number of cells per frame. The inter-frame gap is the number of idle cells in the stream between successive frames. The inter-cell gap is the number of idle cells between successive non-idle cells in a given frame. The interface means allows these parameters to assume non-constant values, e.g., the FS may be specified by a random number generating function having a uniform distribution over a pre-selected range. The frame generator produces source ATM cell streams accordingly.

Collectively, the FS, IFG and ICG frame source parameters provide a minimal set of parameters in terms of the structure of a cell stream to adequately characterize traffic patterns at the frame level. As such, the traffic pattern of a standardized ATM cell stream may be characterized, and hence reproduced by various test generators, by specifying a number of input frame sources, the FS, IFG and ICG parameters for each such frame source, and a multiplexer arbitration scheme. This further allows reproduction of experiments by different test laboratories which is an important requirement in connection with performance testing.

In the preferred embodiment, the transmission rates of each of the source ATM cell streams and the output ATM cell stream may be also specified, if desired. The specification of the transmission rates further characterizes the traffic patterns of the output cell stream since, other things being equal, the presentation of cells to the multiplexer will vary depending on the transmission rates of the corresponding source cell streams.

BRIEF DESCRIPTION OF DRAWINGS

The foregoing and other aspects of the invention will become more apparent from the following description of the preferred embodiments thereof and the accompanying drawings which illustrate, by way of example, the principles of the invention. In the drawings.

DETAILED DESCRIPTION OF PREFERRED EMBODIMENTS

Figure 1:
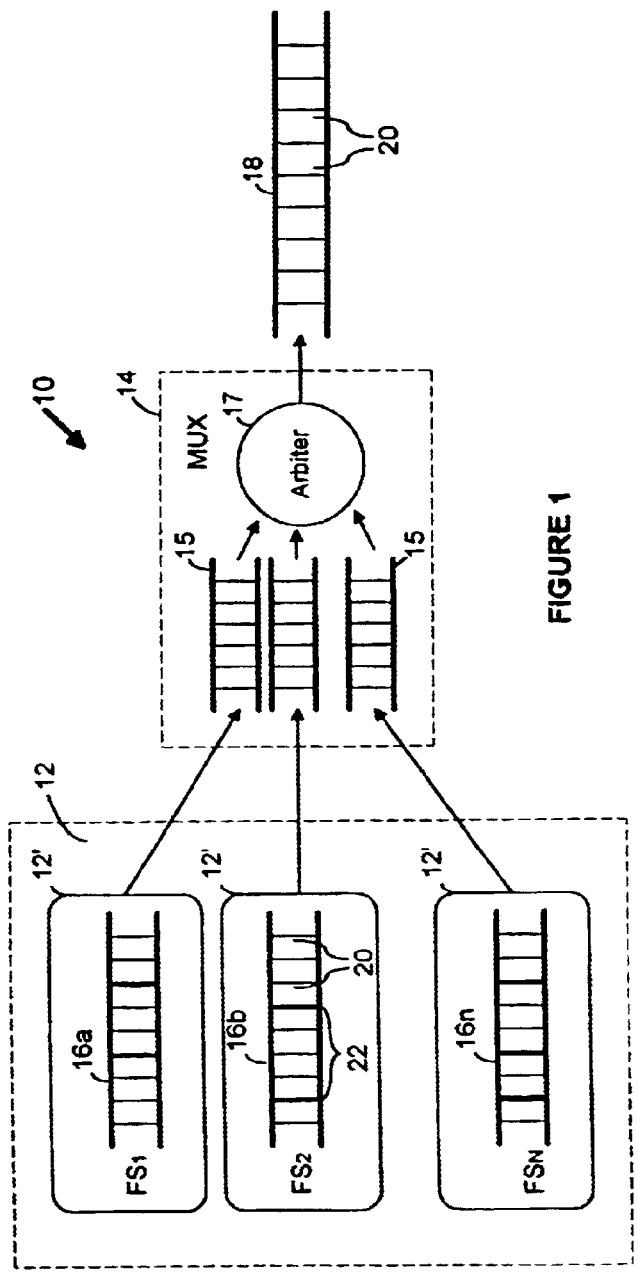
FIG. 1 is a functional block diagram of an ATM frame reference load model generator according to the preferred embodiment.

FIG. 1 is a functional block diagram of an ATM frame reference load model generator 10 according to the preferred embodiment. The generator 10 comprises two basic functional components, a frame source generator 12 and a multiplexer 14. The frame source generator 12 generates N source cell streams 16a, 16b, . . . 16n (collectively designated by ref. no. 16). Each source cell stream is an ATM cell stream whose structure is defined at the frame level, i.e., with respect to the characteristics of a frame source, as described in greater detail below. Hence, the source cell streams 16 include ATM cells 20 which are correlated to higher level frames 22. The multiplexer 14 receives the N source cell streams 16, and multiplexes them in accordance with a pre-determined arbitration scheme in order to produce a single output ATM cell stream 18 comprising ATM cells 20. The output stream 18 is preferably used as an input for an ATM device or system under test (not shown).

Figure 6A:
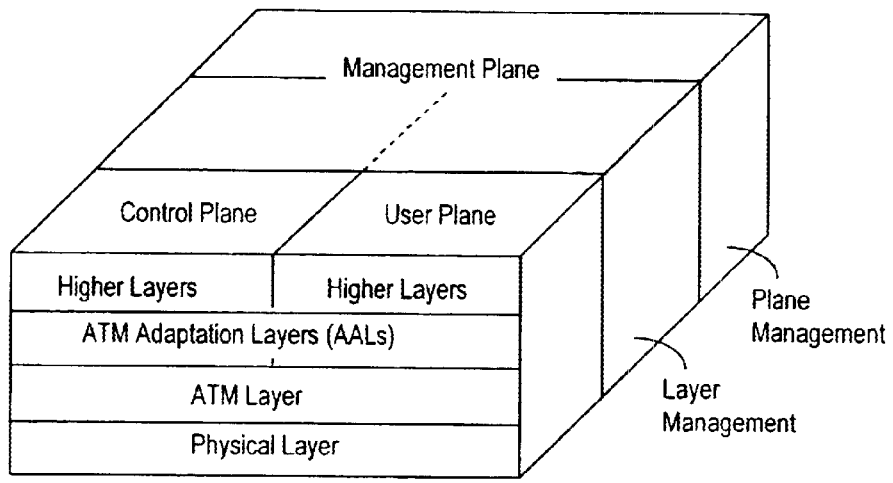
FIG. 6A is a diagram of a B-ISDN protocol stack.
Figure 6B:
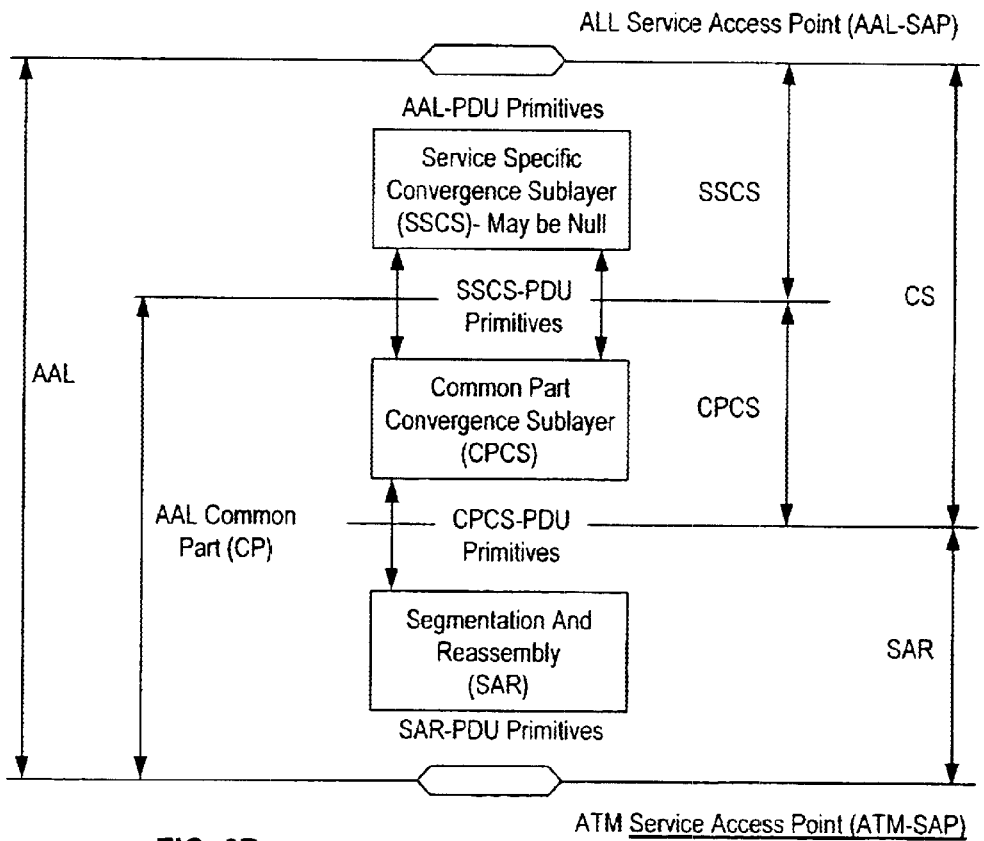
FIG. 6B is a diagram of a generic ATM Adaption Layer (AAL) protocol sublayer.
Figure 6C:
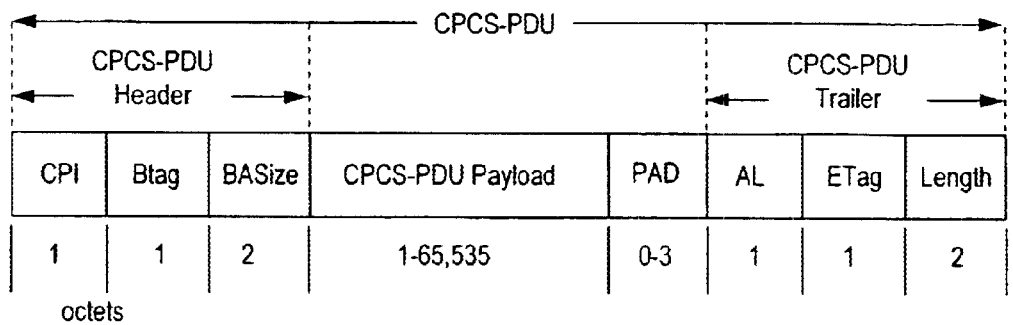
FIG. 6C is a diagram of an AAL3/4 Common Part Convergence Sublayer Protocol Data Unit (AAL3/4 CPCS-PDU)
Figure 6D:
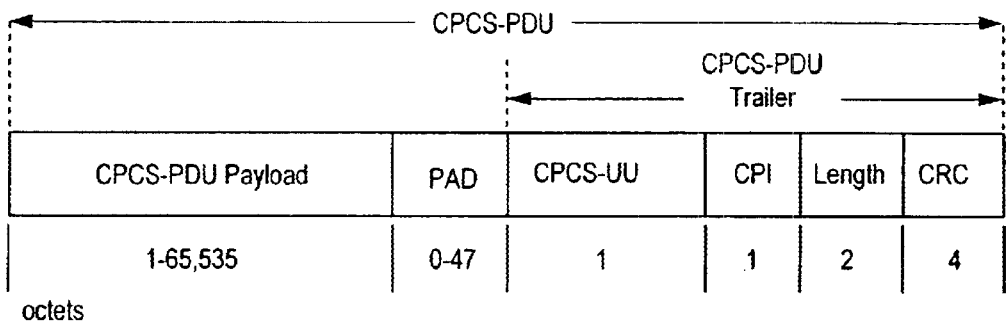
FIG. 6D is a diagram of an AAL5 Common Part Convergence Sublayer Protocol Data Unit (AAL5 CPCS-PDU)
Figure 7A:
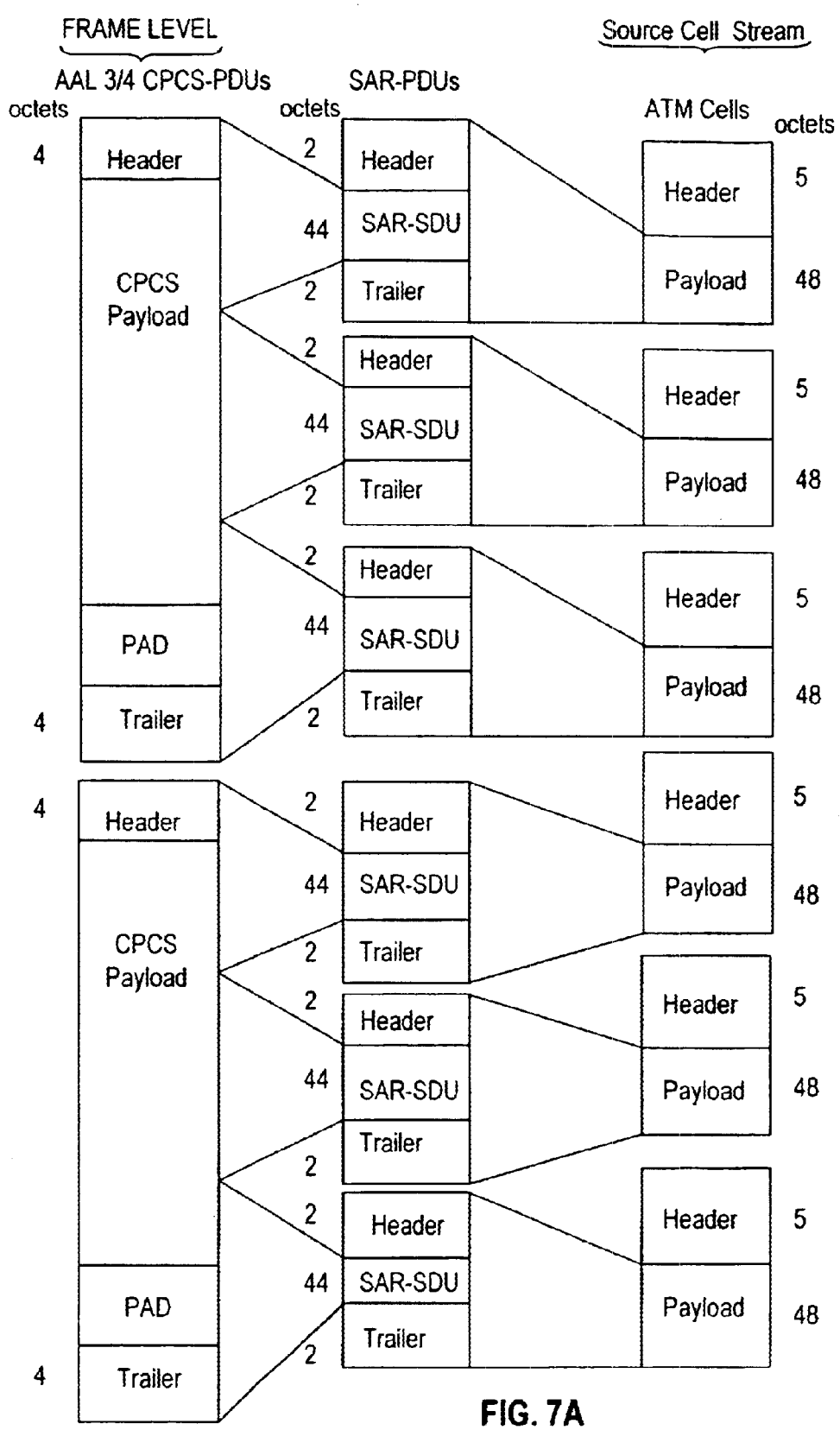
FIG. 7A is a protocol encapsulation diagram illustrating a cell stream correlated to the AAL Common Part Convergence Sublayer.
Figure 7B:
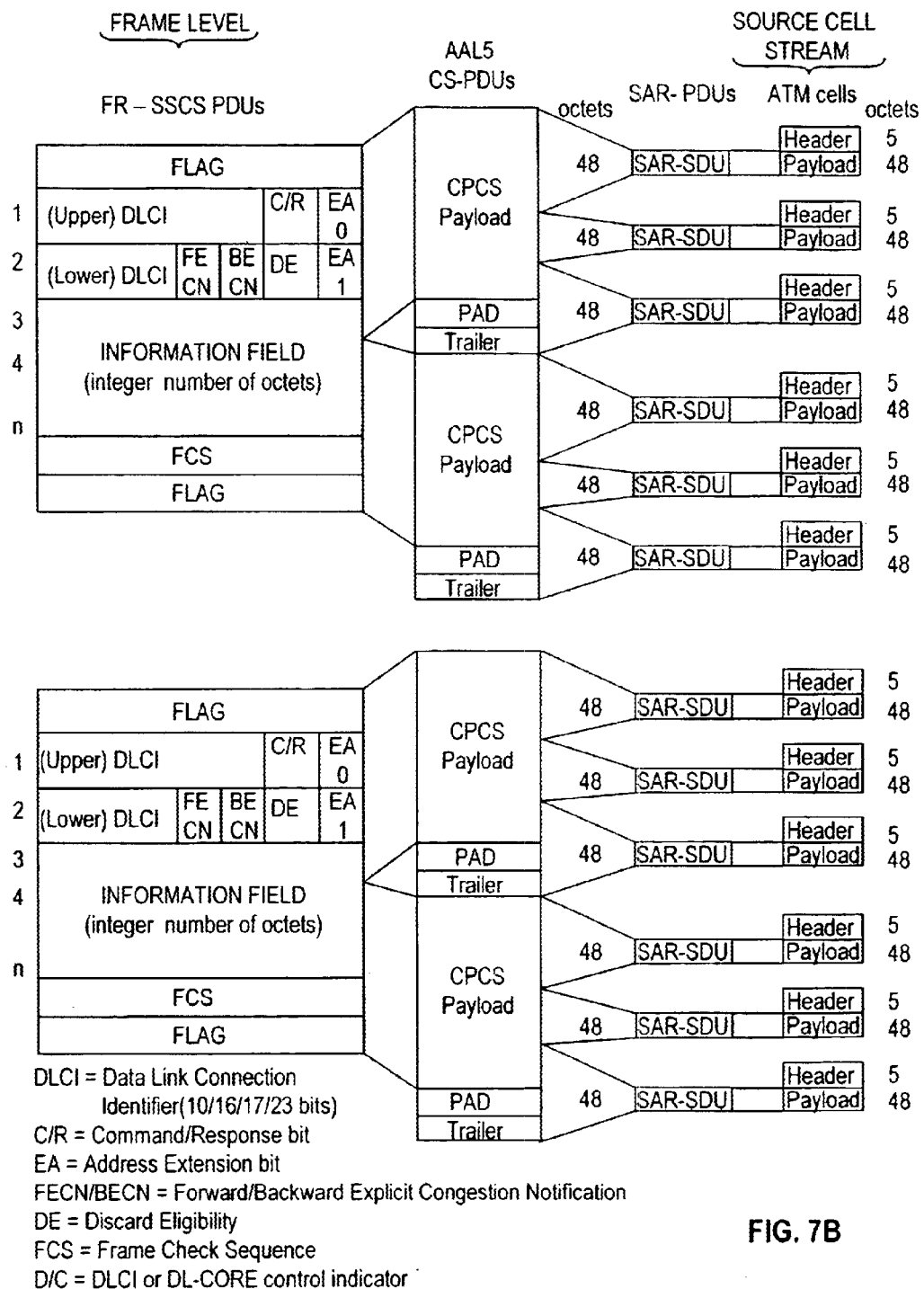
FIG. 7B is a protocol encapsulation diagram illustrating a cell stream correlated to a Frame Relay Service Specific Convergence Sublayer (FR-SSCS).

The ATM protocol level or frame level forming the basis for the source cell streams 16 may vary depending on testing requirements. In the preferred embodiment, the frame level is correlated to the Common Part Convergence Sublayer (CPCS) of the ATM Adaption Layer (AAL) protocol sublayer model shown in FIG. 6B. Thus, in the preferred embodiment, a "reference frame" is a CPCS Protocol Data Unit (CPCS-PDU) such as the AAL3/4 CPCS-PDU shown in FIG. 6C or the AAL5 CPCS-PDU shown in FIG. 6D. Accordingly, each preferred source stream comprises a series of 53 byte ATM cells carrying CPCS-PDUs enveloped by Segmentation and Reassembly PDU headers and trailers (if applicable, depending on the type of AAL protocol). An example of this is shown in FIG. 7A for the AAL3/4 protocol. If desired, however, the frame level may be correlated to another level of the B-ISDN protocol reference model (as specified for instance in ITU-T Recommendation I.321) summarily shown in FIG. 6A. For example, the frame level may be defined with respect to higher data link or even application layers, such as frame relay or Internet Protocol (IP) transmission protocols, in order to test connectivity at that protocol level. In such cases then, the reference frame is the transmission packet, e.g., frame relay packet, and the source cell streams 16 each comprise a series of ATM cells carrying the transmission packets enveloped by lower protocol layer headers and trailers. An example of such a source cell stream correlated to a Frame Relay Service Specific Convergence Sublayer (FR-SSCS) level is illustrated in FIG. 7B.

Figure 2:
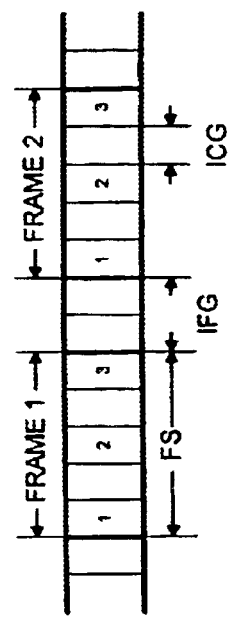
FIG. 2 is a diagram of a cell stream illustrating a variety of parameters used in the preferred embodiment to characterize the stream.

FIG. 2 illustrates the structure of a given source cell stream 16 according to the preferred embodiment. Three parameters are used to define each corresponding frame source, as follows:

Frame Size (FS)—the size, in cells (i.e., data cells), of each reference frame. This preferably excludes the frame level headers or trailers (e.g., the eight byte AAL5 trailer which is of fixed size for every reference frame).

Inter-cell Gap (ICG)—the number of idle cells between successive cells in the reference frame. For the first cell in a reference frame this is effectively zero.

Inter-frame Gap (IFG)—the number of idle cells between the transmission of successive reference frames. For the first frame of a frame source this is effectively zero.

An "idle cell", or alternatively an "unassigned cell" as known in the art, is an ATM cell which is specially coded to "fill" empty time slots in physical media having synchronous cell time slots such as DS3 or SONET. Such cells are defined in the ATM standards, including ATM Forum UNI 4.0, ITU Recommendation I.361, and ANSI T1.62.

The inputs for each of the FS, ICG and IFG into the generator 10 may be specific integer values, or a range of integer values (for example, 2 . . . 5) and the generator 10 can implement any function or algorithm that returns an integer from the specified range. This provides the generator 10 with the capability to model many different types of sources of data traffic.

In the example source cell stream shown in FIG. 2, the frame source parameters are constant with FS=5, ICG=1, and IFG=2. It will be appreciated, however, that these parameters may have values based on statistical functions or frequency distributions, such as bell-shaped (or Gaussian) frequency distributions or random Ad distributions. For instance, a model of a video source may be characterized by having a frame size which follows a uniform distribution of between 3 and 6, i.e., $FS_i$=uniform (3 . . . 6) with $IFG_i$=9−$FS_i$, and ICG=1, where i is an instanteation of a frame. Other mathematical functions may also be used to define these parameters. Collectively, these three parameters represent a minimal set of parameters in terms of the structure of a source cell stream to adequately characterize traffic patterns at the frame level. Accordingly, these parameters may be used to standardize the description of a frame source and, in conjunction with a specification of the arbitration scheme, may be used to characterize a standardized, reproducible, ATM cell stream which realistically models frame sources and thereby provide effective performance testing.

The frame source 12 and the multiplexer 14 can be implemented by those skilled in the art in hardware or software. The preferred embodiment employs a software-based approach as illustrated in FIG. 1 and by the flow charts of FIGS. 3A to 3C.

Figure 3A:
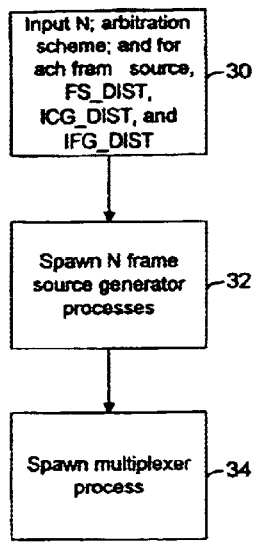
FIGS. 3A, 3B and 3C are flowcharts describing the operation of the ATM reference load model generator according to the preferred embodiment, with FIG. 3B relating to a frame source generator process and FIG. 3C relating to a multiplexer process.

FIG. 3A illustrates a startup phase wherein the operating parameters of the ATM frame reference load model generator 10 are set up. In a first step 30 an interface means is employed to specify a number, N, of frame sources. The interface means is also employed to specify a frame size distribution, FS_DIST, an inter-cell gap distribution, ICG_DIST, and an inter-frame gap distribution, IFG_DIST, for each such frame source. Similarly, the interface means is used to specify the multiplexer arbitration scheme. In the preferred embodiment, FS_DIST, ICG_IST, IFG_IST and the arbitration scheme are functions or objects which are written into the computer code so that the interface means comprises a conventional programming environment. However, more sophisticated user interface means may be employed, if desired. For example, a number of distribution and arbitration functions may be pre-programmed and a graphical user interface (GUI) employed to enable a user to select which function or object to use for each frame source parameter or arbitration scheme. Alternatively, the GUI may permit the user to interactively enter a mathematical expression for the computation of distributions.

At step 32, the software spawns N parallel frame source generator processes 12' (e.g., N independently and concurrently executing computer code threads), each of which functions as an independent frame source to produce a separate one of the frame reference streams 16. The frame generator processes 12' are shown in FIG. 1, and collectively compose the frame generator 12. The flowchart for one frame source generator process 12' is shown in FIG. 3B and discussed below.

At step 34, the software spawns a multiplexer process 14', corresponding to the multiplexer 14 shown in FIG. 1. The multiplexer 14 comprises a plurality of first-in-first-out buffers 15, one for each frame source, which are used to buffer cells 20 received from the frame source generator processes 12'. The multiplexer 14 employs an arbitration object or module 17 which is used to schedule the cells stored in the buffers 15 to the output stream 18 in accordance with the selected arbitration scheme. The flowchart for the multiplexer process 14' is shown in FIG. 3C and discussed below.

Figure 3C:
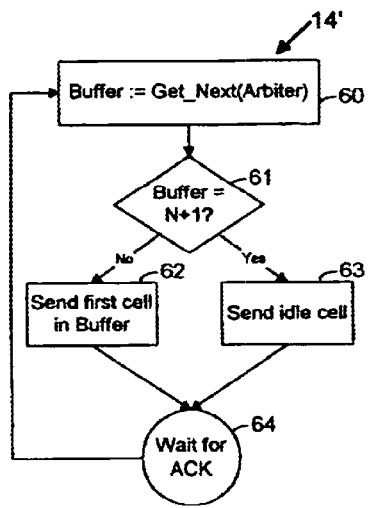
Figure 3B:
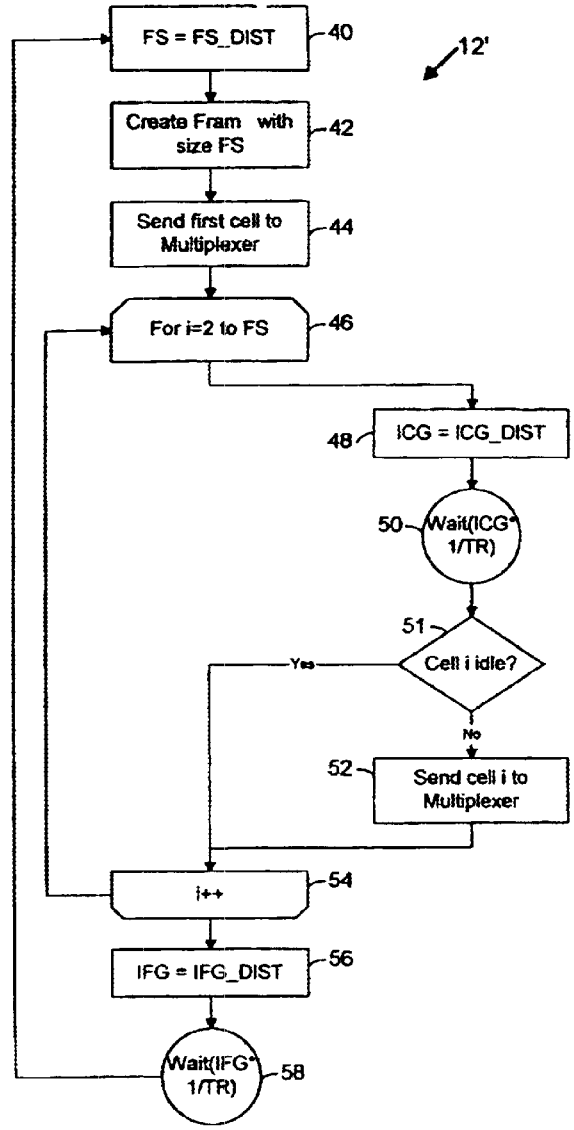

Referring to FIG. 3B, at an initial step 40 the frame size for a notional frame about to be produced is computed based on the frame size distribution function, FS_DIST. At step 42, process 12' creates a group of ATM cells corresponding to a frame (such as shown in FIG. 7A or 7B) having a frame size specified in step 40. The data carried by the cells, i.e., the frame data, may be pre-determined, or generated on-the-fly. Its contents are typically not important. At step 44, the first cell of the cell group or frame is sent to the corresponding first-in-first-out buffer 15 associated with the multiplexer process 14'. Steps 46 to 54 set up a processing loop based on the frame size. In the loop, the inter-cell gap (measured in number of cells) is computed at step 48 based on the inter-cell gap distribution function, ICG_DIST. At step 50 the process is placed in a wait state for a time interval equal to the inter-cell gap multiplied by the inverse of the transmission rate (TR) (i.e., the cell period) for the source cell stream 16. Once the time interval corresponding to the inter-cell gap has elapsed, a check is made at step 50 to determine whether or not the next cell of the frame is an idle cell. If so, then control is passed to end of loop step 54. If the next cell is not an idle cell, then at step 52 the next cell in the frame is sent to the corresponding frame buffer 15 associated with the multiplexer process 14'. At step 56, once the entire frame created in step 42 has been sent to the corresponding frame buffer 15, the inter-frame gap (measured in number of cells) is computed based on the inter-frame gap distribution function, IFG_DIST. At step 58 process 12' is placed in a wait state for a time interval equal to the inter-frame gap multiplied by the inverse of the transmission rate for the frame source.

Once the time interval corresponding to the inter-frame gap has elapsed, control reverts back to initial step 40 for another iteration of process 12'. In this manner, one of the source cell streams 16 is preferably generated.

Referring additionally to FIG. 3C, the multiplexer process 14' is shown. In an initial step 60, the multiplexer process 14' employs a function associated with the arbitration object to select a "winning" buffer 15 associated with one of the frame source generator processes 12'. At step 61, a check is made to determine whether the winning buffer is a valid buffer. The event of the winning buffer being invalid means that none of the (valid) buffers 15 had a cell to transmit and thus at step 63 the multiplexer process 14' sends an idle cell to an output port (not shown) for inclusion in the output cell stream 18. If the winning buffer is a valid buffer, then at step 62 the multiplexer process 14' removes the head of queue cell from the winning buffer and sends it to the output port. At step 64, the process 34' waits for acknowledgement from the output port confirming that the head of queue cell of the winning frame buffer has been transmitted. (Alternatively, if the output port does not provide any feedback, the multiplexer process 14' could wait for a timer interval equal to the reciprocal of the transmission rate provided by the output port.) After this time interval has elapsed, control reverts back to the initial step 60.

Figure 4:
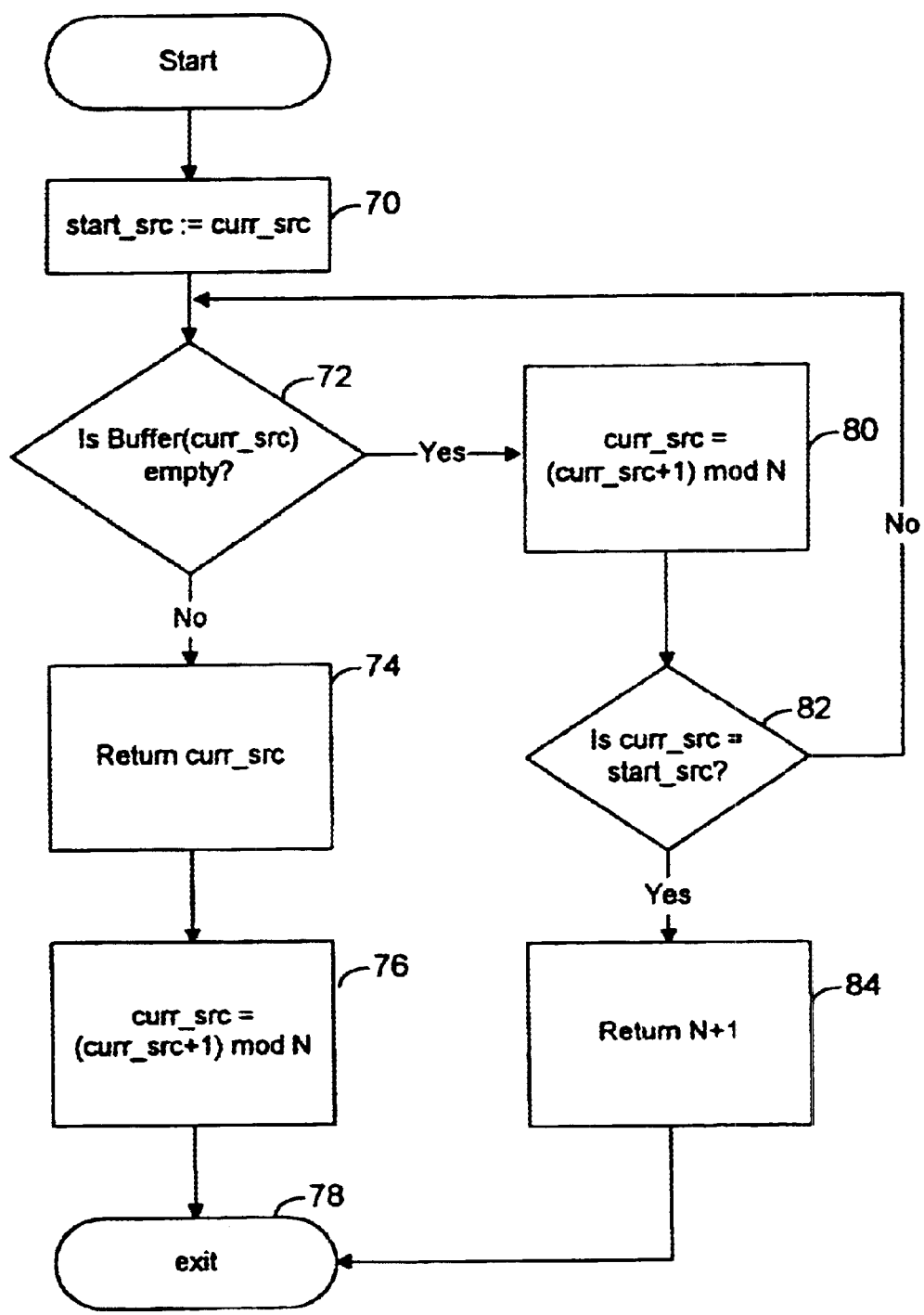
FIG. 4 is a flowchart of a round-robin, work-conserving, scheduler or arbiter which may be employed by the multiplexer.

One example of an arbitration function that could (although not necessarily must) be called by the multiplexer process 14' is a work-conserving round robin scheduler whose preferred algorithm is shown in FIG. 4. The algorithm employs a variable, curr_src, to point to a "current" buffer 15. At step 70, the current buffer is memorized at the start of the function. At step 72, a check is made whether or not the current buffer is empty. If not, then at step 74 the value of curr_src is returned to the multiplexer process 14' in order to enable it to forward the head of queue cell of the currently-pointed-to buffer to the output port. At step 76, the value of curr_src is incremented in round-robin fashion and the function then terminates at step 78. If, however, the currently-pointed-to buffer is empty at step 72, then steps 80 and 82 set up a processing loop to examine in round-robin fashion the remaining buffers to determine which one is non-empty, at which point control passes to step 74. If all the buffers are empty, then because the scheduler is work conserving, at step 84 a value of N+1 representing an invalid buffer is returned to the multiplexer process 14' so that it can forward an idle cell to the output port.

Other arbitration schemes that may be employed, for example, include weighted round robin (e.g., queue length weighted), exhaustive round robin, or combinations thereof and any other conventional arbitration scheme.

Figure 5:
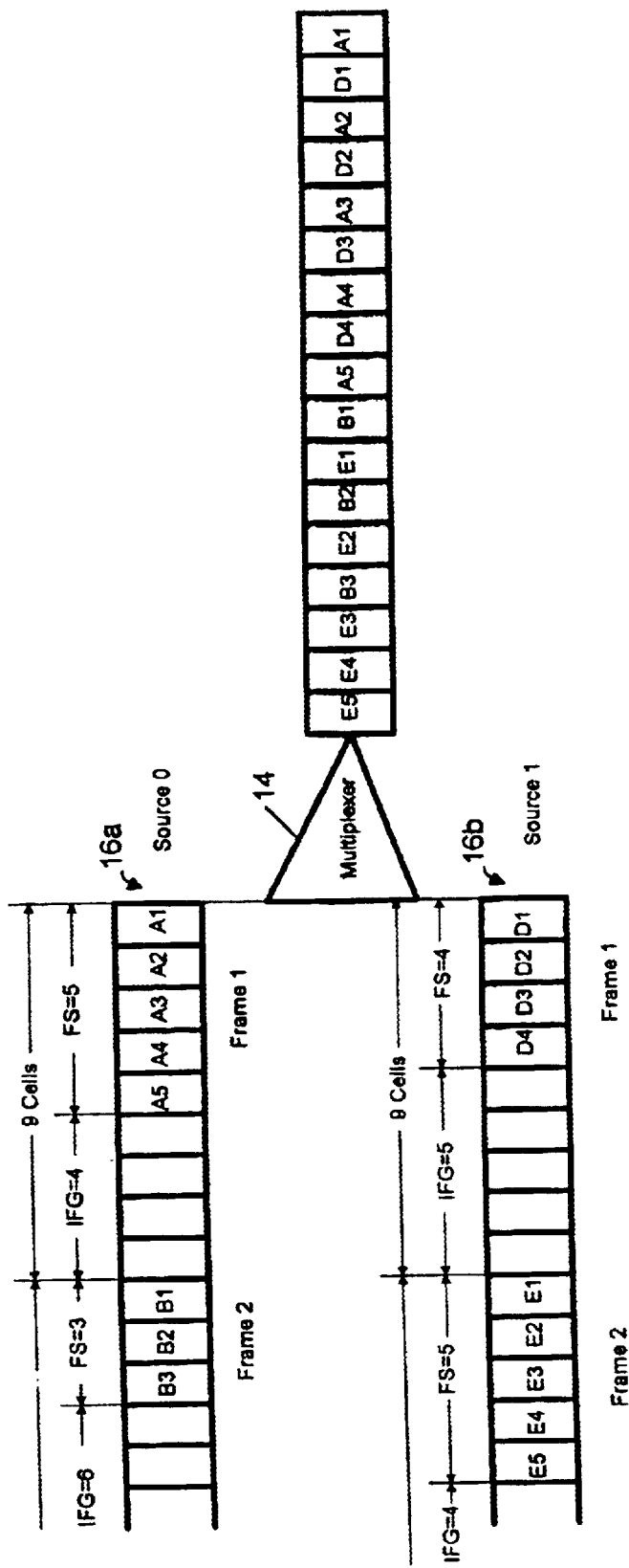
FIG. 5 is a diagram illustrating an example of the inputs and output of the ATM reference load model generator.

An example of the operation of the generator 10 is provided with reference to FIG. 5. The example presents two sources of video compression frame streams each having the following characteristics:

1. The compressed video data frame size varies according to a uniform random distribution between 3 and 6 cells, i.e., FS_DIST=Uniform (3,6);
2. The data frames burst at line rate; that is, ICG_DIST Ø;
3. A new data frame is sent every nine cells; therefore, IFG_DIST=9−$FS_i$, where i represents an instantiation of a frame and $FS_i$ is the frame size at that instant.

FIG. 5 shows segments of frame reference streams 16 and the corresponding output ATM cell stream 18 in circumstances where the multiplexer 14 implements the work-conserving round-robin arbitration scheme illustrated in FIG. 4.

In the preferred embodiment, the transmission rates of the source cell streams 16 and output stream 18 are constant. However, in alternative embodiments this need not to be so, and thus the interface means may be employed to specify the transmission rates for streams 16 and 18. It will be appreciated that the traffic pattern of the ATM output stream 18 will, other things being equal, typically be dependent on the relative mix of tranismission rates of the source cell streams 16.

It will be understood by those skilled in the art that the device or system under test must be configured with respect to the channel or virtual connection identifiers associated with each of the source cell streams.

In the preferred embodiment, the translation of frames into ATM cells (including the 5 byte ATM header) is carried out by the frame source generator 12. In alternative embodiments, the frame reference streams 16 could carry only the payload of ATM cell 20 and the task of adding the ATM header could be carried out by the multiplexer 14. It will also be understood by those skilled in the art that the frame source generator 12 and multiplexer 14 need not be discrete components but can be implemented in an integrated virtual device.

It will also be understood by those skilled in the art that the invention is intended to encompass evolving ATM standards. Thus, while the preferred embodiment has made reference to the 53 byte fixed sized ATM cells which provide the source streams, other types of packets may be used, and the sizes of such packets may be user-specified by the interface means and implemented by the frame source processes. For example, the cell size could be specified using a uniform or other type of distribution function in order to provide a variable sized cell.

Similarly, those skilled in the art will appreciate that numerous modifications, variations and enhancements may be made to the preferred embodiment without departing from the spirit of the invention.

What is claimed is:

1. A frame reference load model generator comprising:
   a frame parameter module for defining a frame size (FS) of cells, an inter-frame gap (IFG) and an inter-cell gap (ICG) for modelling at least one frame source;
   a frame module for generating a plurality of cell streams, each cell stream of said plurality of cell streams having one FS, one IFG and one ICG of one frame source of said at least one frame source; and
   a multiplexer for generating an output cell stream on a cell basis utilizing said plurality of cell streams and an arbitration scheme selecting amongst characteristics of each of said plurality of cell streams.

2. The frame reference load model generator according to claim 1, wherein each cell stream of said plurality of cell streams is an ATM cell stream and said output cell stream is an output ATM cell stream.

3. The frame reference load model generator according to claim 2, wherein said frame module spawns an independently operable frame generation process for each cell stream of said plurality of cell streams.

4. The frame reference load model generator according to claim 3, wherein said each cell stream adheres to an ATM common part convergence sublayer protocol model.

5. The frame reference load model generator according to claim 4, further comprising a transmission rate module for specifying a transmission rate for at least one of: (a) said plurality of cell streams and (b) said output cell stream.

6. The frame reference load model generator according to claim 2, wherein
   said multiplexer further comprises a plurality of first-in-first-out (FIFO) buffers to store said each cell stream received from said frame module therein; and
   at a cell interval, said arbitration scheme selects an individual FIFO buffer of said plurality of buffers and provides a cell positioned at a head of said individual FIFO buffer to said output cell stream.

7. The frame reference load model generator according to claim 6, wherein said arbitration scheme utilizes a round-robin queue selection scheme.

8. The frame reference load model generator according to claim 7, wherein said round-robin queue selection scheme comprises a scheme selected from a scheme group comprising at least a work-conserving round robin scheme, a weighted round-robin scheme and an exhaustive round-robin scheme.

9. A method of generating an output cell stream for use in testing data transmission performance of a communication device, said method comprising the steps of:
   (a) defining a frame size (FS) of cells, an inter-frame gap (IFG) and an inter-cell gap (ICG) for modelling at least one frame source;
   (b) generating a plurality of cell streams, each cell stream of said plurality of cell streams having one FS, one IFG and one ICG of one frame source of said at least one frame source; and
   (c) generating said output cell stream on a cell basis utilizing said plurality of cell streams and an arbitration scheme selecting amongst characteristics of each of said plurality of cell streams.

10. The method of generating an output cell stream according to claim 9, wherein each cell stream of said plurality of cell streams is an ATM cell stream and said output cell stream is an output ATM cell stream.

11. The method of generating an output cell stream according to claim 10, wherein said step (b) generates each cell stream of said plurality of cell streams using an independently operable frame generation process.

12. The method of generating an output cell stream according to claim 11, wherein said each cell stream adheres to an ATM common part convergence sublayer protocol model.

13. The method of generating an output cell stream according to claim 12, wherein said step (a) also includes defining a transmission rate for at least one of: (i) said plurality of cell streams and (ii) said output cell stream.

14. The method of generating an output cell stream according to claim 10, the method further comprising the step of:
   (b1) storing said each cell stream received from said frame module in one of a plurality of first-in-first-out (FIFO) buffers; and
   wherein said step (c) further comprises, at a cell interval, selecting an individual FIFO buffer of said plurality of buffers said arbitration scheme and providing a cell positioned at a head of said individual FIFO buffer to said output cell stream.

15. The method of generating an output cell stream according to claim 14, wherein said arbitration scheme utilizes a round-robin queue selection scheme.

16. The method of generating an output cell stream according to claim 15, wherein said round-robin queue selection scheme comprises a scheme selected from a scheme, group comprising at least a work-conserving round robin scheme, a weighted round-robin scheme and an exhaustive round-robin scheme.

17. A testing device for use in testing data transmission performance of a communication device, comprising:

a frame parameter module for defining a frame size (FS) of cells, an inter-frame gap (IFG) and an inter-cell gap (ICG) for modelling at least one frame source;

a frame module for generating a plurality of cell streams, each cell stream of said plurality of cell streams having one FS, one IFG and one ICG of one frame source of said at least one frame source;

a multiplexer for generating an output cell stream on a cell basis utilizing said plurality of cell streams and an arbitration scheme selecting amongst characteristics of each of said plurality of cell streams; and an output for providing said output cell stream to an input port of said communication device, wherein said data transmission performance of said communication device is evaluated using processing performance of said output cell stream by said communication device.

18. A method of testing data transmission performance of a communication device, said method comprising the steps of:

(a) defining a frame size (FS) of cells, an inter-frame gap (IFG) and an inter-cell gap (ICG) for modelling at least one frame source;

(b) generating a plurality of cell streams, each cell stream of said plurality of cell streams having one FS, one IFG and one ICG of one frame source of said at least one frame source;

(c) generating said output cell stream on a cell basis utilizing said plurality of cell streams and an arbitration scheme selecting amongst characteristics of each of said plurality of cell streams; and (d) providing said output cell stream to an input port of said communication device, wherein said data transmission performance of said communication device is evaluated using processing performance of said output cell stream by said communication device.

* * * * *